United States Patent

Mori et al.

[15] 3,670,637

[45] June 20, 1972

[54] AUTOMATIC TIMING NETWORK FOR CAMERA SHUTTERS

[72] Inventors: Chiharu Mori; Toru Nakajima, both of Tokyo-to, Japan

[73] Assignee: Asahi Kogaku Kogyo Kabushiki Kaisha, Tokyo-to, Japan

[22] Filed: Nov. 25, 1968

[21] Appl. No.: 778,433

[30] Foreign Application Priority Data

Nov. 28, 1967 Japan....................................42/75897

[52] U.S. Cl. ..........................95/10 CT, 95/53 EB, 250/206, 317/124, 317/148.5, 356/223

[51] Int. Cl..........................................G03b 7/08, G01j 1/44

[58] Field of Search.....................95/10 C, 53; 250/200, 206, 250/215; 356/218, 223, 226; 315/159; 317/124, 148.5

[56] References Cited

UNITED STATES PATENTS

| | | | |
|---|---|---|---|
| 3,286,610 | 11/1966 | Fahlenberg | 95/10 C |
| 3,324,779 | 6/1967 | Nobusawa et al. | 95/10 C |
| 3,418,479 | 12/1968 | Schmitt | 356/223 X |
| 3,434,403 | 3/1969 | Biedermann et al. | 95/10 C |
| 3,470,798 | 10/1969 | Miyakawa | 95/10 C |
| 3,504,603 | 4/1970 | Brzonkala et al. | 95/10 C |
| 3,393,604 | 7/1968 | Lundin | 95/10 C X |
| 3,533,348 | 10/1970 | Yanagi | 95/10 C X |

OTHER PUBLICATIONS

G.E. Transistor Manual, General Electric Company, Syracuse, N.Y., 1964, pp. 115–116.

*Primary Examiner*—Joseph F. Peters, Jr.
*Attorney*—Stanley Wolder

[57] ABSTRACT

A camera shutter timing network includes a photoconductor connected in series with a plurality of diodes, the voltage across the diodes which is a logarithmic function of the photoconductor incident light is amplified by a variable gain amplifier to produce a first voltage. A second diode network combined with variable resistors and an amplifier produces a second voltage which is a logarithmic function of the camera diaphragm opening and film speed rating. A memory capacitor is charged to the difference of the two voltages and a timing capacitor is charged through a diode type logarithmic expansion network at a constant rate dependent on the memory capacitor voltage. An electromagnet energized through a Schmitt type switch releases the shutter to closing upon a predetermined voltage on the timing capacitor. A meter indicates the difference between the first and second voltages and hence the shutter speed.

11 Claims, 9 Drawing Figures

INVENTORS
CHIHARU MORI
TORU NAKAJIMA
BY Stanley Wolder
ATTORNEY

INVENTORS
CHIHARU MORI
TORU NAKAJIMA
BY Stanley Wolder
ATTORNEY

INVENTORS
CHIHARU MORI
TORU NAKAJIMA
BY Stanley Wolder
ATTORNEY

INVENTORS
CHIHARU MORI
TORU NAKAJIMA
BY Stanley Wolder
ATTORNEY

INVENTORS
CHIHARU MORI
TORU NAKAJIMA
BY Stanley Wolder
ATTORNEY

AUTOMATIC TIMING NETWORK FOR CAMERA SHUTTERS

BACKGROUND OF THE INVENTION

The present invention relates generally to improvements in the automatic time control of camera shutters and it relates particularly to an improved network for the automatic closing of a single lens reflex camera in response to the incident light through the lens.

In conventional automatic exposure time control mechanisms for a signal lens reflex camera, the exposure time control operation is performed in the following manner. During the preparatory operation for photographing such as viewing of the object or focusing, the object brightness is sensed by a photoconductor located in the path of the light from the object traversing the objective and entering the view finder. An electric charge of an amount corresponding to the sensed object brightness is temporarily memorized as a charge upon a capacitor. In synchronism with the shutter release operation the capacitor is inserted into another circuit, where the charged terminal voltage of said capacitor controls the exposure time.

In actual operation, in order to apply such operation factors as the diaphragm value, the sensitivity or speed value of the film used, etc. to the camera, a variable resistor for transforming such factor values to electric signals is coupled to the diaphragm setting ring and to the film sensitivity setting ring. After setting of the diaphragm value and the film sensitivity value through actuation of said setting rings, the power source switch of the network is closed, and the light measuring operation is performed during the photographing preparatory operation such as focusing. Upon depressing the shutter release button after completion of light measurement, a reflective mirror in the camera is swung up. Immediately before the mirror starts to move, the capacitor is inserted into another circuit. At this time, the light measurement value memorized as a charge upon the capacitor (including the conditions of the disphragm value and film sensitivity value) controls the operation of another circuit. When the release is actuated and the shutter opening screen starts to run, a timing capacitor begins to be charged and time measurement based on the time constant value is started. When the time corresponding to the time measurement value has elapsed, the shutter closing screen is released by the operation of an electromagnet so that the shutter is closed. When the closing screen completes its movement, the mirror returns to its original position in the path of the light that has passed through the objective, and the mechanism returns to its initial state. Thus the photographing operation is completed. Upon advancing the film, the camera is prepared for the next photographing operation.

With such automatic exposure time control arrangement, the required exposure time control must be a time control inversely proportional to object brightness. Therefore with a photoconductor having a characteristic:

$Rc = KE^{-g}$, wherein $Rc$ is the internal resistance value of the photoconductor element, $E$ is the object brightness and $K$ and $g$ are constants characteristic of the element, it is required that $g=1$. As is well known, however, it is hard to produce a photoconductor having a constant value of $g$ within the variation range of 1:100,000, of the object brightness, and it is extremely difficult to obtain one with $g$=1. Further, it is very difficult to achieve uniform quality. Thus, among photoconductor elements factured under the quality control, there is variety of internal resistance $Rc$ or $g$ so that it is not easy to manufacture or select elements of the desired characteristic. In view of such circumstances, it is strongly desired that the above problem in light measurement be solved.

SUMMARY OF THE INVENTION

It is a principal object of the present invention to provide an improved automatic shutter control network for a camera.

Another object of the present invention is to provide an improved shutter timing network which is accurate over a wide brightness range with light sensitive elements of widely varying characteristics.

Still another object of the present invention is to provide an improved simple automatic shutter timing network having photoconductor $g$ compensation and adjustments for such parameters as diaphragm value, film speed rating and the like.

A further object of the present invention is to provide in the arrangement of the above type a visual indication of the exposure time value determined by said proper automatic exposure time control operation with an evenly calibrated scale due to a linear voltage variation, prior to shutter release operation.

Still a further object of the present invention is to provide in the arrangement compensation for the influence of the ambient temperature upon its control operation so that proper exposure time control is always possible.

Another object of the present invention is to provide a network of the above characteristics which is readily built as a monolithic integrated circuit structure.

The above and other objects of the present invention will become apparent from a reading of the following description taken in conjunction with the accompanying drawings which illustrate preferred embodiments thereof.

In a sense the present invention contemplates the provision of a camera shutter timing network comprising a photoconductor having a resistance which is an exponential function of the light incident thereon, means coupled to said photoconductor for producing a control voltage which is a logarithmic function of the current in said photoconductor, and means responsive to the value of said control voltage for controlling the closing of said camera shutter. Advantageously the timing network comprises a photoconductor, a memory capacitor first means for charging said memory capacitor to a voltage which is a function of said control voltage, a timing capacitor, second means for charging said timing capacitor at a constant current which is a function of the voltage across said memory capacitor, and third means responsive to the voltage across said timing capacitor for controlling the closing of said camera shutter.

In the preferred form, a photoconductor such as cadmium sulphide having an electric resistance characteristic of exponential variation in response to brightness variation is combined with logarithmic compression elements such as diodes so that the circuit will produce a voltage linearly varying in response to the exponential variation of brightness. This voltage is applied to a $g$ compensation circuit to accomplish such compensation that, while compensation is made of the non-uniformity of the photoconductor characteristic, in the operative circuit there is produced an appropriate electrical charge variation in a geometrical procession with a common ratio of 2 in response to factors applied from outside. As a result, the exposure setting condition such as the sensitivity value of the film used, the diaphragm value determined prior to photographing, the filter coefficient, etc. are transformed into a linear voltage variation which is then applied to the relevant apparatus. Then, computation is made by the circuit operation under said conditions and the resulting electrical variation amount is memorized as a charge on a capacitor. When the shutter is released, the voltage across said capacitor is transformed into a current corresponding to said electrical charge amount resulting from said computation through logarithmic expansion elements such as transistors. This current is utilized to constant-current charge a timing capacitor of constant capacitance so as to control the exposure time utilizing the time duration required by the voltage across the capacitor to rise up to a certain value.

DESCRIPTION OF THE PREFERRED EMBODIMENTS

Figures 1A, 1B:
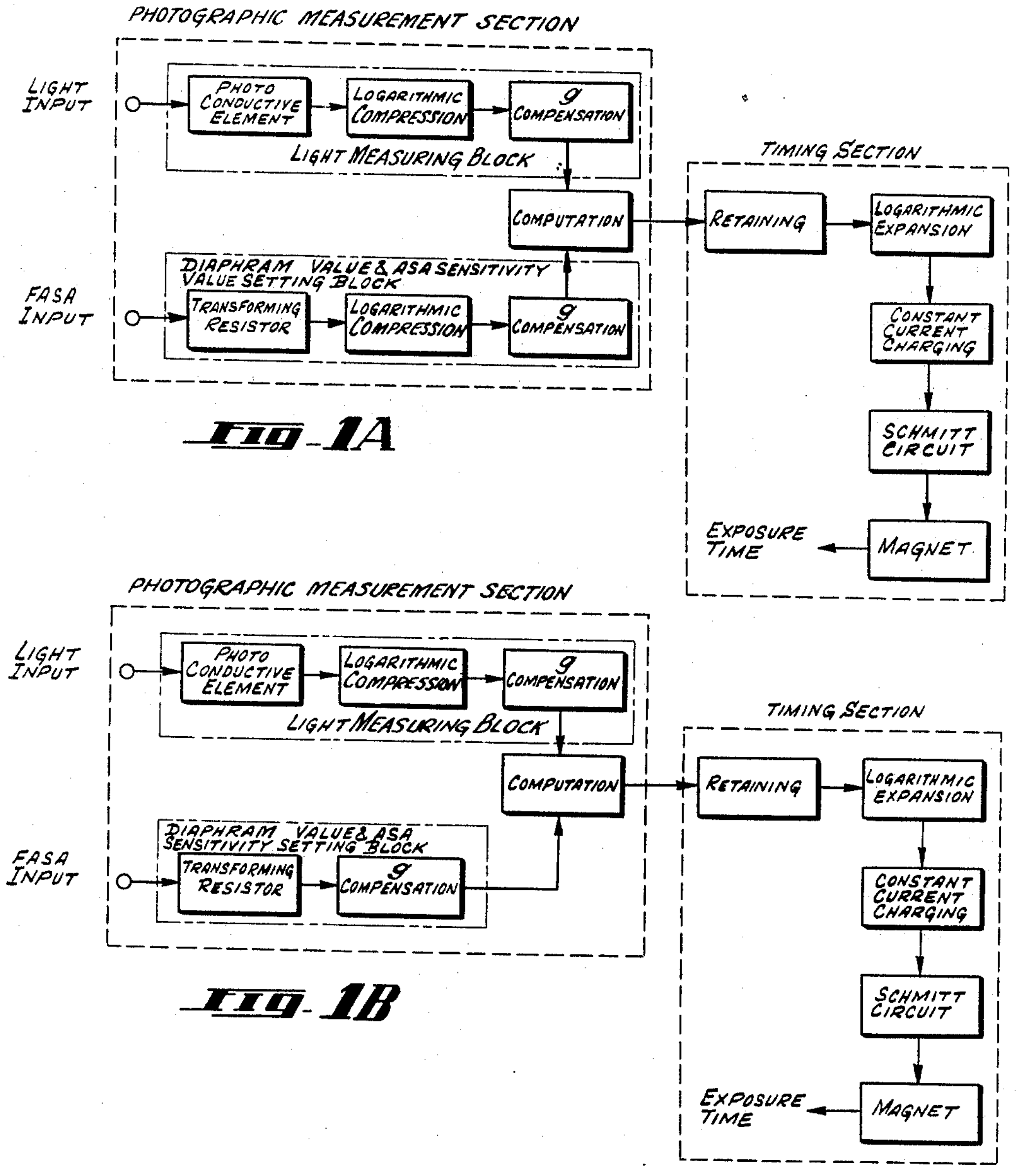
FIG. 1A is a block diagram of a network embodying the present invention employing an equilibrium type exposure factor control section.
FIG. 1B is a block diagram of a network embodying the present invention employing a non-equilibrium type exposure factor control section.

Referring now to the drawings, there are shown circuit networks, connected as illustrated and as hereinafter explained, including transistors T$n$ ($n$ = 1, 2, ... , 37), resistors r$n$ (n = 1, 2, ... , 19), variable resistors Vr$n$ (n = 1, 2, ..., 10), switches $SW_B$, $SW_E$, $SW_F$, $SW_M$ and $SW_T$, a Zener diode ZD, an electromagnet Mg for releasably retaining the shutter closing screen in its cocked retracted position, a photoconductor CdS made of a material such as cadmium sulphide positioned in the path of light from the object which has passed through the objective lens and entered the viewfinder, a memorizing capacitor $C_M$, a timing capacitor $C_T$, an electric meter M for indicating the value to be set, and a power source battery $E_B$.

Figure 2:
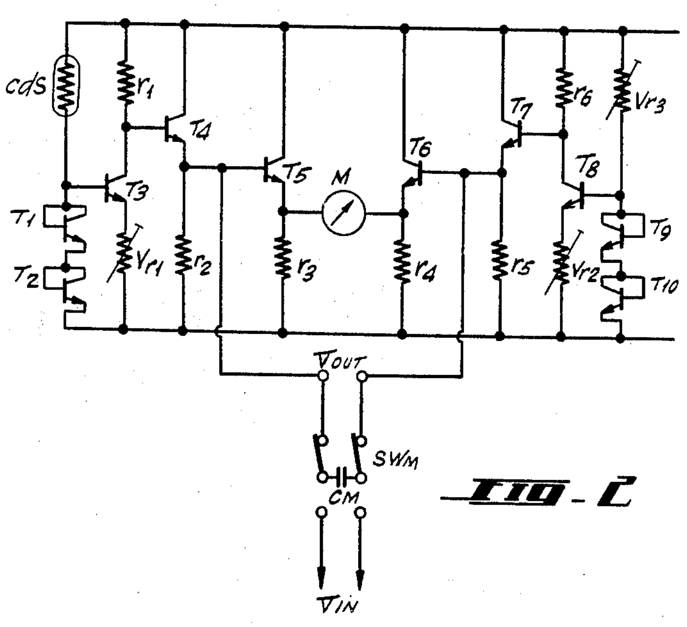
FIG. 2 is a circuit diagram of an example of an equilibrium type photographic measurement section according to the present invention.

As shown in FIGS. 1A and 1B, the system according to the present invention is of two types differing in the manner of electric transformation of the diaphragm value and film sensitivity value in the photographic measurement section, namely the equilibrium type photographic measurement section and the non-equilibrium type photographic measurement section, respectively. First, the arrangement according to the present invention will be described with respect to the equilibrium type photographic measurement section, referring to one example thereof as shown in FIG. 2. The light from the object that has passed through the objective lens is transformed into photocurrent as controlled by the action of the photoconductor CdS. Then, owing to the diode action of the transistors $T_1$ and $T_2$ connected in series with the photoconductor CdS, a voltage $V_{D1.2}$ which is proportional to the logarithm of said photocurrent is developed at the junction of the photoconductor CdS and the transistor $T_1$. In mathematical form:

$$R_{CdS} = k_1 I^{-g} \quad (1)$$

wherein $R_{CdS}$ is the internal resistance of the photoconductor CdS, $I$ is the light input incident thereon, and $k_1$ and $g$ are the characteristic constants of the particular photoconductor CdS.

Taking the logarithms of the both sides of the relation (1):

$$\log R_{CdS} = \log k_1 - g \log I \quad (2)$$

With respect to a logarithmic compression circuit due to the diode action of said transistor $T_1$ and $T_2$, there exists the following relation:

$$\log R_{CdS} = \log k_2 - k_3 V_{D1.2} \quad (3)$$

wherein $V_{D1.2}$ is the voltage across the terminals of the transistors $T_1$ and $T_2$, $k_2$ is a constant and $k_3$ is a compression constant. From the relations (2) and (3), the following relation results:

$$V_{D1.2} = (g/k_3) \log I + K_o \quad (4)$$

wherein $K_o = (1/k_3) \log (k_2/k_1)$ = constant. Thus, through said circuit the light input $I$ is transformed into a linearly varying voltage $V_{D1.2}$ wherein a logarithmic compression appears in the form of $(g/k_3) \log I$. The increment due to the light input in the relation (4) is:

$$V_{D1.2'} = \frac{g}{k_3} \log I \quad (5)$$

Hereafter, signal input or output values provided with ' denotes the increment of the corresponding value.

In the $g$ compensation circuit comprising the transistor $T_3$, which the voltage $V_{D1.2}$ is its output signal, the resistor $r_1$ serially inserted in the collector circuit of the transistor $T_3$ and the circuit characteristic adjusting variable resistor $V_{r1}$ serially inserted in the emitter circuit of the transistor $T_3$, assuming the voltage gain thereof to be $G_1$, the collector voltage $V_{c3}$ is given as follows:

$$V_{c3'} = -G_1 V_{D1.2'} \quad (6)$$

Therefore, by adjusting said variable resistor $V_{r1}$, the circuit system of the present invention can be so compensated with respect to the $g$ characteristic of the photoconductor CdS and the constants of circuit constituting elements that the circuit operates on the basis of the logarithmic expansion current which is proportionated to the light input signal.

The next stage emitter follower circuit comprising a transistor $T_4$ and a resistor $r_2$ serially connected in the emitter circuit thereof serves to perform an impedance transforming action for connection of the memorizing capacitor $C_M$. Assuming the voltage gain of this circuit to be $G_2$, the signal voltage $V_{e4'}$ developed by the transistor $T_4$ at the emitter circuit thereof due to the light input signal is given as follows:

$$V_{e4'} = G_1^* (g/k_3) \log I \quad (7)$$

wherein $G_1^* = -G_1 \times G_2$ ($G_2 \approx 1$). This signal voltage $V_{e4'}$ is the output of the light measuring block. This light measuring block serves to the timing section in cooperation with the diaphragm value and the film sensitivity value setting block to be hereinafter described.

A transformation which is similar to the transformation of light measuring block is also applied to the diaphragm and the film sensitivity value setting block comprising a variable resistor $V_{r3}$, which is coupled to the diaphragm value setting ring and to the film sensitivity setting ring in a manner well known in the art in the conventional camera of the subject type in order to be set in accordance with the diaphragm value and the film sensitivity value, a logarithmic compression circuit consisting of transistors $T_9$ and $T_{10}$ serially connected to said variable resistor $V_{r3}$, a $g$ compensation circuit consisting of a transistor $T_8$, a resistor $r_6$ and a variable resistor $V_{r2}$, and an emitter follower circuit consisting of a transistor $T_7$ and a resistor $r_5$.

When the resistance $R_3$ of the variable resistor $V_{r3}$ is determined in response to the diaphragm value and the film sensitivity value, with respect to the logarithmic compression circuit due to the diode action of the transistor $T_9$ and $T_{10}$, the following relation is established;

$$\log R_3 = \log k_5 - k_6 V_{D9,10} \quad (8)$$

wherein $V_{D9,10}$ is the voltage across the terminals of the transistor $T_9$ and $T_{10}$, $k_5$ is a constant, and $k_6$ is a compression constant. The signal increment in the set value is:

$$V_{D9,10'} = -\frac{1}{k_6} \log R_3. \quad (9)$$

Assuming the voltage gain of the $g$ compensation circuit to be $G_4$, the signal increment voltage $V_{c8'}$ in the collector voltage of the transistor $T_8$ is:

$$V_{c8'} = -G_4 V_{D9,10'} = \frac{G_4}{k_6} \log R_3. \quad (10)$$

The signal increment voltage $V_{e7'}$ appearing in the emitter voltage of the transistor $T_7$ due to the action of the emitter follower circuit is:

$$V_{e7'} = G_5 V_{e8'} \doteqdot V_{e8'} \quad (11)$$

wherein $G_5$ is the voltage gain of the transistor $T_7$ ($G_5 \approx 1$).

Now, to the said memorizing capacitor $C_M$ is applied a voltage of a value which is the difference between said voltage $V_{e7'}$ in response to the set value input signal and said voltage $V_{e4'}$ in response to the light input signal. The voltage gains of the circuits must be suitably adjusted so that the increment of $V_{e4'}$ corresponding to the one step of the light input varying in a geometrical procession with the common ratio 2 is equal to the increment of $V_{e7'}$ corresponding to the one step of the diaphragm value or the film sensitivity value varying in a similar manner.

An emitter follower circuit comprising a transistor $T_5$, a resistor $r_3$, a transistor $T_6$ and a resistor $r_4$ functions as a buffer for the output voltage $V_{e4'}$ due to said light input signal and the output voltage $V_{e7'}$ due to said set value input signal and serves as a driving circuit for the indication of exposure time with the electric meter M.

Figure 3:
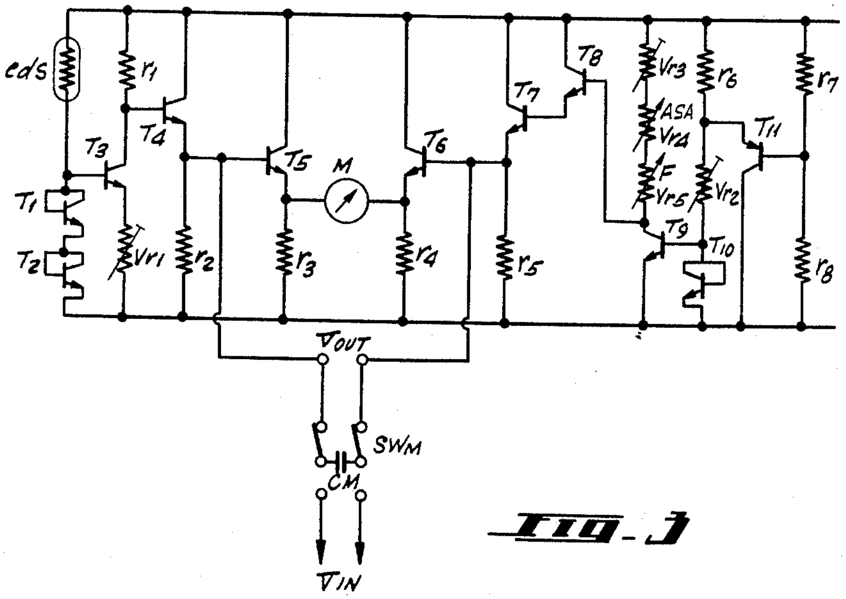
FIG. 3 is a circuit diagram of an example of a non-equilibrium type photographic measurement section according to the present invention.

Referring now to FIG. 3 which illustrates the non-equilibrium photographic measurement section which is another example of the measurement section of the system according to the present invention, the light input signal voltage due to the action of the photoconductor CdS and other circuit elements is the same as described in connection with the network shown in FIG. 2. However, the arrangement for obtaining the signal of set values such as the diaphragm value and the film sensitivity value is different from that in the example as shown in FIG. 2. A constantcurrent circuit is established with transistors $T_9$, $T_{10}$ and $T_{11}$, a variable resistor $V_{r2}$, and resistors $r_6$, $r_7$ and $r_8$. In the collector circuit of the transistor $T_9$ there are serially connected a variable resistor $V_{r5}$ for transforming of diaphram value and a variable resistor $V_{r4}$ for transforming of film sensitivity value and an adjusting variable resistor $V_{r3}$ for adjusting DC operating point, the variable resistors $V_{r5}$ and $V_{r4}$ being independently coupled to the diaphragm value setting ring and the film sensitivity value setting ring respectively and being of such characteristic that the resistance varies linearly with the turning operation of the corresponding rings respectively.

Accordingly, assuming now the supply voltage to be $V_{cc}$, the emitter voltage $V_{e11}$ of the silicon PNP transistor $T_{11}$ is given as follows:

$$V_{e11} = \frac{r_8}{r_7 + r_8} \cdot V_{cc} + V_{BE11} \quad (12)$$

wherein $V_{BE11}$ is the base-emitter voltage of the transistor $T_{11}$ in operating, and $r_7$ and $r_8$ are the resistance of the resistor $r_7$ and $r_8$ respectively. Assuming that a current $I_B$ flows through the variable resistor $V_{r2}$ in the current adjustment, $$I_B = \frac{V_{e11} - V_{BE10}}{V_{r2}} = \frac{(r_8/(r_7+r_8))V_{cc} + V_{BE11} - V_{BE10}}{V_{r2}} \quad (13)$$

wherein $V_{BE10}$ is the base-emitter voltage of the transistor $T_{10}$ in operating. If the temperature dependence of voltage $V_{BE10}$ is equal to that of voltage $V_{BE11}$, then $I_B$ is always constant irrespectively of the ambient temperature variation. Therefore, if DC current amplification factor $h_{FE} >> 1$ in the transistor $T_9$ and $T_{10}$, $$I_B \approx I_{c9} \quad (14)$$

wherein $I_{c9}$ is the collector current of the transistor $T_9$. Thus the collector current of the transistor $T_9$ turns out to be a constant current. In order to carry out the diaphragm value and the film sensitivity value transformation in this state through setting of the values of said variable resistors $V_{r5}$ and $V_{r4}$, a circuit shall be established which satisfies the following condition: In the following relation (15) $\Delta$ R or $I_{c9}$ is to be so selected that the emitter voltage increment $\Delta V_{e4'}$ of the transistor $T_4$ in response to one step change of the light input signal is equal to the emitter voltage increment $\Delta V_{e7'}$ of the transistor $T_7$ in response to one step change of the diaphragm value and the film sensitivity value:

$$\Delta V_{e4'} = \Delta V_{e7'} = \Delta R_{F \cdot ASA} \times I_{c9} \times G_5 \quad (15)$$

wherein $\Delta R_{F.\ ASA}$ is the one step variation of the values of the variable resistors $V_{r4}$ and $V_{r5}$ in response to the diaphragm value and the film sensitivity value, and $G_5$ is the voltage gain of the Darlington connection circuit comprising the transistor $T_7$ and $T_8$ and the resistor $r_5$ ($G_5 \approx 1$).

The main function of the variable resistor $V_{r3}$ is to compensate through adjustment of the resistance thereof the non-equilibrium of the D.C. operation level due to the non-equilibrium circuit system. Further function of the variable resistor $V_{r3}$ is, however, to carry out compensation for the non-uniformity of the resistance of the photoconductor CdS so as to compensate the indication level of the exposure time on the electric meter M, in a very ready manner and independently of the diaphragm value transformation and the film sensitivity value transformation.

The Darlington connection circuit comprising the transistors $T_7$ and $T_8$ and the resistor $r_5$ serves as a buffer not to exert influence due to load upon the diaphragm value and the film sensitivity value setting section, and also serves to compensate the temperature dependence of the emitter voltage of the transistor $T_4$ on the light input signal side.

The operation of other arrangements, such as the electric meter M, of this non-equilibrium type photographic measurement section is the same as the case with the equilibrium type photographic measurement section as shown in FIG. 2.

Figure 4:
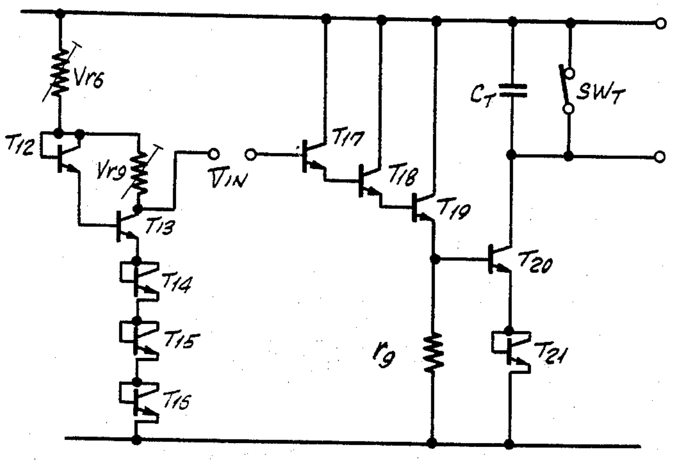
FIG. 4 is a circuit diagram of an example of memory retaining and logarithmic expansion circuits.

In FIG. 4 there is shown the timing section of the system according to the present invention. In a three stage Darlington circuit comprising transistors $T_{17}$, $T_{18}$ and $T_{19}$ and a resistor $r_9$ and a logarithmic expansion circuit comprising transistors $T_{20}$ and $T_{21}$, the base input signal voltage $V_{in}$ of the transistor $T_{17}$ is given as follows:

$$V_{in} = G_3 \cdot k_4 \cdot \log I_c = k_4{}^* \log I_c \quad (16)$$

wherein $I_c$ is the collector current of the transistor $T_{20}$, $k_4$ is the expansion constant, $G_3$ is the voltage gain of the Darlington connection circuit comprising the transistors $T_{17}$, $T_{18}$ and $T_{19}$ and the resistor $r_9$ ($G_3 \approx 1$), and $k_4{}^* = G_3 \cdot k_4$.

For obtaining a current which is proportional to the light input in the system according to the present invention, from the relations (7) and (16) the following relation shall be established:

$G_1{}^*$ $(g/k_3) \log I = k_4' \log I_c$, so that the following relation must result:

$$G_1{}^* = (k_3\, k_4{}^*/g) \quad (17)$$

When the resultant voltage gain $G_1{}^*$ which consists of the voltage gain $G_1$ of the $g$ compensation circuit of the light measuring block and the voltage gain $G_2$ of the emitter follower circuit comprised of the transistor $T_4$, is so determined as to satisfy the relation (17), then the operation characteristics of this circuit system, including the $g$ of the photoelectrical characteristics of the photoconductor CdS, is properly compensated so that a current which is proportional to the light input signal can be obtained as the collector current of the transistor $T_{20}$.

The retaining circuit and the logarithmic expansion circuit of the timing section is described below in conjunction with the network shown in FIG. 4. The structural coupling of the shutter timing network according to the present invention with camera mechanism is fundamentally the same as that of the conventional cameras of this type. In the system according to the present invention, however, the function of retaining the input signal voltage is performed by a high input impedance circuit comprising the memorizing capacitor $C_M$ and the transistors $T_{17}$, $T_{18}$ and $T_{19}$. The result of computation in the photographic measurement section is stored through the switch $SW_M$ in the memorizing capacitor $C_M$. When a release button is depressed, the resulting release action causes the switch $SW_M$ to be changed over from the photographic measurement section to the timing section just before the upswing of the mirror, and the photographic measurement section voltage $V_{out}$ across the memorizing capacitor $C_M$ is applied between the collector of the transistor $T_{13}$ and the base of the transistor $T_{17}$ as the timing section input voltage $V_{in}$. Since the retaining circuit comprising the transistors $T_{17}$, $T_{18}$ and $T_{19}$ and the resistor $r_9$ has a high input impedance characteristic due to three stage Darlington network, the output voltage across the memorizing capacitor $C_M$ of the result of the computation retains the time necessary for shutter action as the input voltage $V_{in}$ of the timing section. In the logarithmic expansion and constant current charging circuit comprising a transistor $T_{20}$ and $T_{21}$, the logarithmic expansion action is made through the diode characteristic between the base and the emitter of the transistor $T_{20}$ and the diode action of the transistor $T_{21}$, and further, utilizing the collector characteristics of the transistor $T_{20}$, the timing capacitor $C_T$ is charged by a constant-current.

Figure 7:
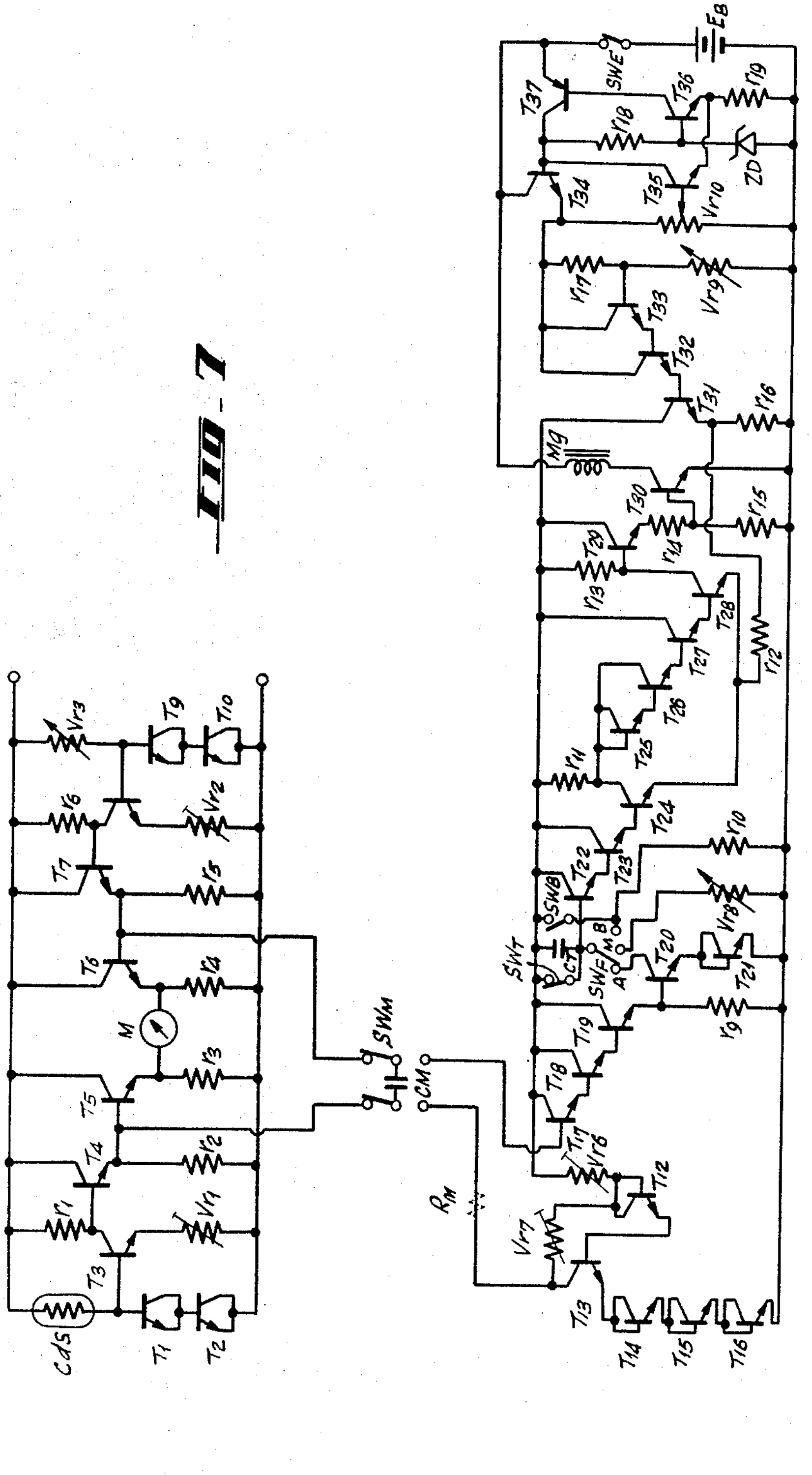
FIG. 7 is a circuit diagram of an example of the automatic shutter control system according to the present invention utilizing the equilibrium type photographic measurement section.
Figure 8:
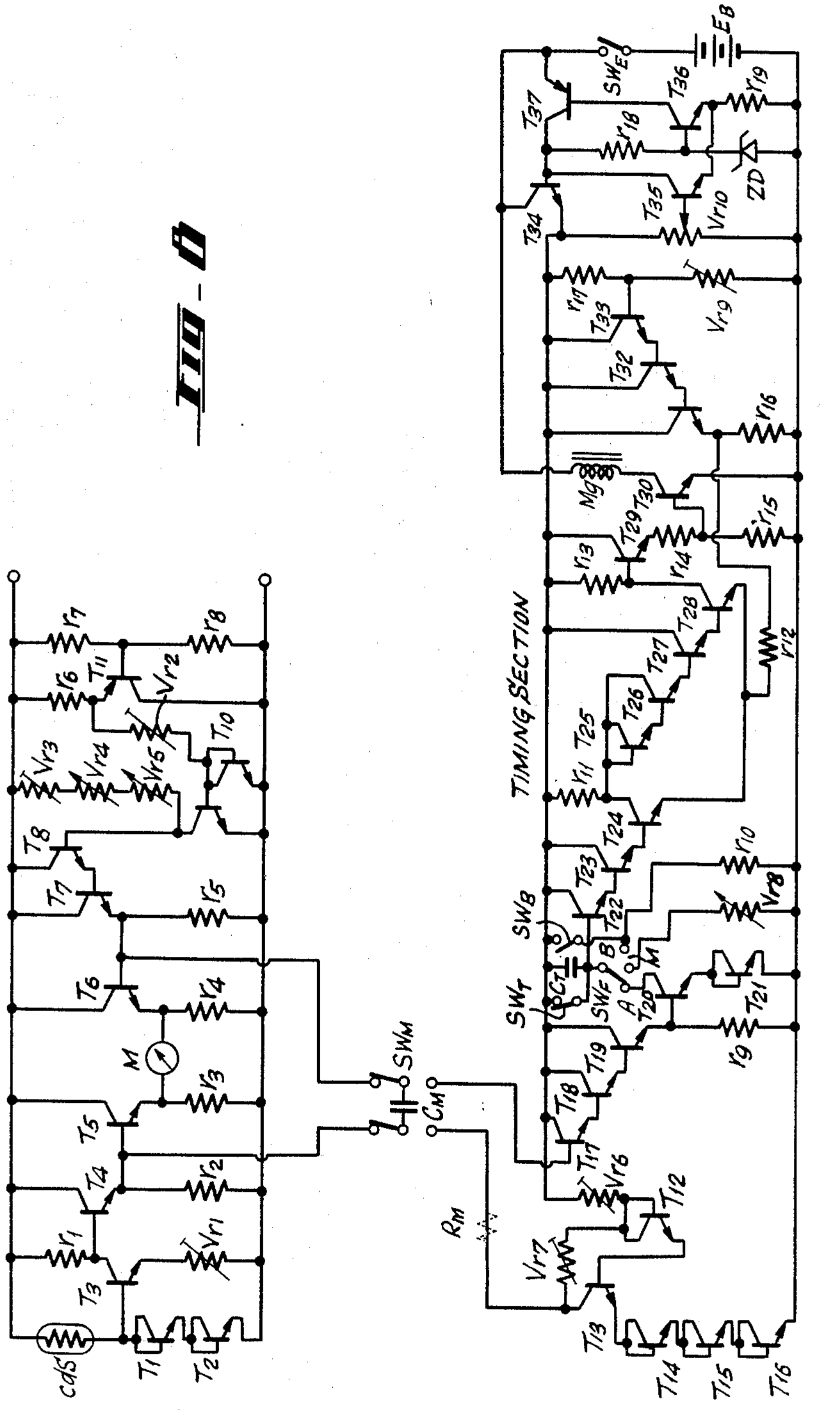
FIG. 8 is a circuit diagram of an example of the automatic shutter control system according to the present invention utilizing the non-equilibrium type photographic measurement section.

In the embodiment illustrated by FIGS. 7 and 8 a memory switch $SW_M$ of bipolar double throw type is used for storing the operational output from the photographic measurement section into a memorizing capacitor $C_M$. Such a memory switch $SW_M$, however, may be replaced by a bipolar single throw switch $SW_{M'}$ having the equal efficiency.

With said bipolar single throw switch $SW_{M'}$, during the operation of measurement ($SW_{M'}$ being ON), the base terminal of the transistor $T_{17}$ is connected through the switch $SW_{M'}$ to the emitter terminal of the transistor $T_7$ while the Darlington circuit of later stage comprising the transistors $T_{17}$, $T_{18}$ and $T_{19}$, and the resistor $r_9$ is interrupted (i.e., inactive). The emitter terminal voltage of the transistor $T_7$ is, therefore, never influenced by connection of the base terminal of the transistor $T_{17}$ with the emitter terminal of the transistor $T_7$. On the other hand, the collector terminal of the transistor $T_{13}$ is in connection through the high resistance $R_M$ and the memory switch $SW_{M'}$ with the emitter terminal of the transistor $T_4$. An influence to which the emitter terminal voltage of the transistor $T_4$ might be subjected is negligible when the collector terminal of the transistor $T_{13}$ is through the high resistance $R_M$ to the emitter terminal of the transistor $T_4$. Thus, the memory switch may be of bipolar single throw type having an arrangement as mentioned above.

There is hereinafter described the optimum operation point (bias point) in practical use of the retaining circuit and the logarithmic expansion circuit comprising the transistors $T_{17}$ to $T_{21}$.

Assuming the base-emitter voltages of the operation points of the transistors $T_{17}$ to $T_{21}$ to be $V_{BE17}$ to $V_{BE21}$ respectively, the base potential $V_{B17}$ of the transistor $T_{17}$ is given as follows:

$$V_{B17} = V_{BE17} + V_{BE18} + V_{BE19} + V_{BE20} + V_{BE21} \quad (18)$$

This is the base potential of the transistor $T_{17}$ in case of the collector current $I_c = 0$ (actually, there is a dark current) in the transistor $T_{20}$, and is the optimum operation point, that is, the bias point (voltage). As indicated by the relation (18), $V_{B17}$ is composed only of base-emitter voltages $V_{BE}$'s which are of the greatest temperature dependence in silicon transistors, consideration must be made sufficiently of temperature compensation. Thus, with respect to the requirements on this bias point, that is, the bias voltage $V_{BE17}$ given by the relation (18) and its temperature dependability, the optimum operation point indicated by the relation (18) is given by a bias circuit comprising the transistors $T_{12}$ to $T_{16}$ and the variable resistors $V_{r6}$ and $V_{r7}$ and further, there is performed a temperature compensation operation for compensating the increment of the expansion current (the collector current of the transistor $T_{20}$) due to temperature change in relation to the base-emitter voltages $V_{BE17}$ to $V_{BE21}$. In this bias circuit, the variable resistor $V_{r6}$ is provided mainly for regulating the circuit current of the transistors $T_{12}$ to $T_{16}$ and the variable resistor $V_{r7}$ is provided mainly for regulating the collectors voltage $V_{c13}$ of the transistor $T_{13}$. The variable resistors $V_{r6}$ and $V_{r7}$ may be so adjusted as to establish the following relation:

$$V_{c13} = V_{BE17} + V_{BE18} + V_{BE19} + V_{BE20} + V_{BE21} = V_{B17} \quad (19)$$

Also, since in this bias circuit the relation between the bias voltage and the temperature dependence can be regulated within a certain range, it is possible to select such operation point in the logarithmic expansion circuit that the widest logarithmic expansion characteristic range is obtained, and further, general regulations such as compensation of D.C. level in the photographic measurement section and regulation of exposure time are possible.

The result of the computation from the photographic measurement section is applied between the collector terminal of the transistor $T_{13}$ and the base terminal of the transistor $T_{17}$ as a timing section input voltage $V_{in}$. This timing section input voltage $V_{in}$ is given as follows (cf. the relation (16)):

$$V_{in} \approx V_{out}$$

$$V_{in} = G_3 \cdot k_4 \log I_c \quad (20)$$

wherein $G_3$ is the voltage gain of the retaining circuit ($G_3 \approx 1$) and $k_4$ is the expansion constant.

When the switch $SW_T$ is changed over from "on" to "off" in snychronism with the start of the camera shutter opening screen, the timing capacitor $C_T$ starts to be charged by the charging current $I_c$ due to the input voltage $V_{in}$. The voltage $V_{CT}$ across the capacitor $C_T$ is given as follows:

$$V_{CT} = \frac{1}{C_T} \int I_c \cdot dt$$

wherein $C_T$ is the capacitance of the timing capacitor $C_T$. Since the charging current $I_c$ is constant due to the collector characteristic of the transistor $T_{20}$, $$V_{CT} = (I_c \cdot t / C_T) \quad (21)$$

wherein $t$ is the time. Accordingly, if the value $V_{CT}$ is selected for the change-over level $V_{SW}$ of the Schmitt circuit, the time $T_d$ required by $V_{CT}$ to rise from 0 up to $V_{SW}$ is given as follows:

$$T_d = (C_T \cdot V_{SW} / I_c) \quad (22)$$

Therefore, the required delay time $T_d$ is obtained by properly selecting the values of $V_{SW}$, $C_T$, and $I_c$; and thus the camera shutter closing screen can start its run after elapse of the time $T_d$ after the start of run of the camera shutter opening screen, the required exposure time being automatically controlled in accordance with the photographing conditions. The non-uniformity of the capacitance of the timing capacitor $C_T$ can be compensated by adjusting the Schmitt change-over level $V_{SW}$ or the charging current $I_c$ in accordance with the relation (22). Adjustment of the Schmitt change-over level $V_{SW}$ can be readily performed by adjusting the variable resistor $V_{r9}$ of FIG. 5; and also adjustment of the charging current $I_c$ can be readily performed by adjusting the variable resistor $V_{r7}$ or $V_{r6}$ of FIG. 4. This is very advantageous in the mass production of the network.

Figure 5:
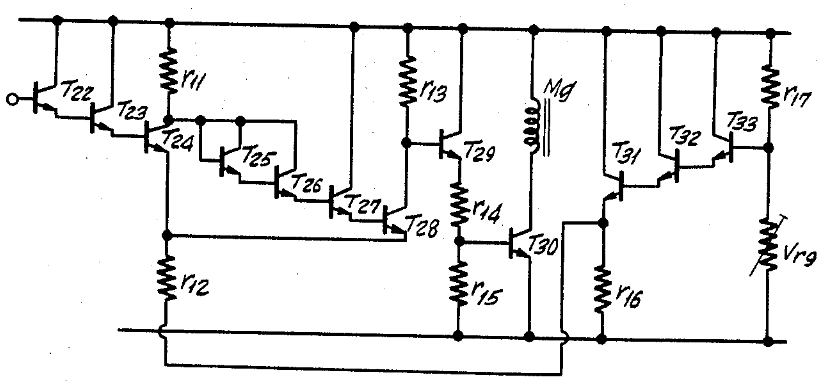
FIG. 5 is a circuit diagram of an example of a Schmitt circuit according to the present invention.

An explanation of the Schmitt circuit section is given below with reference to the example as shown in FIG. 5. In the high input impedance Schmitt circuit comprising transistors $T_{22}$ to $T_{28}$ and resistors $r_{11}$ to $r_{13}$, when the switch $SW_T$ is closed the transistors $T_{22}$ to $T_{24}$ are conducting the transistors $T_{25}$ to $T_{28}$ are non-conducting. Accordingly, through the buffer circuit comprising a transistor $T_{29}$ and resistors $r_{14}$ and $r_{15}$, a transistor $T_{30}$ is conducting so that an electromagnet $M_g$ maintains its energized state. In the arrangement of this type, when the timing capacitor $C_T$ is charged and the transistors $T_{22}$ to $T_{24}$ are conducting, the input impedance as seen from the base side of the transistor $T_{22}$ is inserted in parallel with the constant-current charging circuit. Accordingly, the range of the charging current $I_c$ is restricted so that it is necessary to introduce the three-stage Darlington connection high input impedance Schmitt circuit.

In the practical application of such circuit, however, the base-emitter voltage of each transistor causes the change-over level $V_{SW}$ to be changed due to temperature change. Especially when the power source is of low voltage and the circuit comprises silicon transistors, such circuit system would not be very practical without any temperature compensation.

For this purpose, it is possible that, to the Schmitt circuit comprising the transistors $T_{22}$ to $T_{28}$ and the resistors $r_{11}$ to $r_{13}$ there is added the constant-voltage circuit for temperature compensation (three stage Darlington connection circuit) in series with the power source so as to compensate the temperature dependence of the change-over level $V_{SW}$ of Schmitt circuit.

Assuming that the supply voltage to be $V_{cc}$, the change-over level $V_{SW}$ of the Schmitt circuit is given as follows:

$$V_{SW}= (V_{BE22}+V_{BE23}+V_{BE24})-(V_{BE31}+V_{BE32}+V_{BE33}) +\frac{r_{12}}{r_{11}+r_{12}}(V_{BE31}+V_{BE32}+V_{BE33}-V_{BE25}-V_{BE26}-V_{BE27} -V_{BE28})+V_{cc}\left(\frac{r_{12}}{r_{11}+r_{12}}+\frac{R_9}{r_{17}+R_9}-\frac{r_{12}}{r_{11}+r_{12}}\cdot\frac{R_9}{r_{17}+R_9}\right) \quad (23)$$

wherein $V_{BE22}$ to $V_{BE33}$ are the base-emitter voltages of the transistors $T_{22}$ to $T_{33}$ respectively in operation, and $r_{11}$ – $r_{17}$ and $R_9$ are the values of resistors $r_{11}$ to $r_{17}$ and variable resistor $V_{r9}$ respectively.

From the relation (23) it is known that the temperature dependence of $V_{SW}$ is determined by the temperature dependence of the base-emitter voltage $V_{BE}$ of each transistor. Accordingly, the overall temperature dependence of $V_{SW}$ will be compensated to such an extent that it can be ignored if, in the relation (23), the temperature dependence of the parenthesized first and second terms cancel each other and in the parenthesized third term a value of the order of 1/10 is selected for the coefficient $r_{12}/(r_{11}+r_{12})$. Thus it is possible to obtain a high input impedance type Schmitt circuit having a very small temperature dependence of the change-over level.

As seen in the above example, the utilization of the same types of silicon transistors is particularly effective in case a monolithic IC structure is used.

By utilizing the fact that the change-over level can by shifted by varying the voltage of the temperature compensation constant-voltage circuit serially connected with said Schmitt circuit power supply by the adjustment of a variable resistor $V_{r9}$, it is possible to compensate the non-uniformity of the capacitance of the timing capacitor $C_T$ or the non-uniformity of the exposure time due to that of delay time caused by non-uniformity of elements in circuit.

Figure 6:
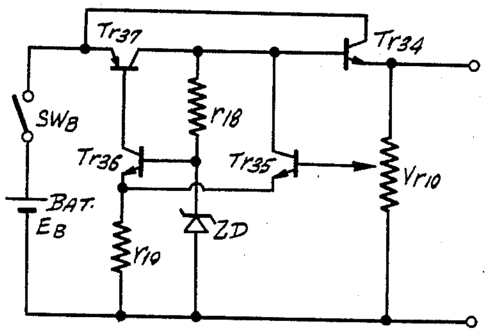
FIG. 6 is a circuit diagram of an example of stabilizing power source circuit in the system according to the present invention.

In cameras of such type, fluctuation of the supply voltage for operation exerts a direct influence upon the exposure time control operation so that it is necessary to stabilize this supply voltage. In the system according to the present invention, the stabilized power supply as shown in FIG. 6 is utilized so that the accurate exposure time control is always possible irrespectively of the fluctuation of the terminal voltage of battery. In the circuit of power supply there are provided an NPN type transistor $T_{34}$ and a PNP type transistor $T_{37}$ in a complementary connection so that an especially high stabilizing performance is assured at times when the terminal voltage of the battery is low and the stabilized output voltage is relatively high.

Two examples of the present invention utilizing the above described networks are shown in FIG. 7 (with the equilibrium type photographic measurement section) and in FIG. 8 (with the non-equilibrium type photographic measurement section).

Thus, the coupling action of the arrangement according to the present invention is almost the same as that of the conventional one of this type. In operation, first the light-input voltage transformation is carried out through the logarithmic compression of the light input by means of a combination of a photoconductor and logarithmic compression elements, then, through a $g$ compensation circuit, said voltage is compensated to be of contemplated $g$ characteristic irrespectively of the non-uniformity of the $g$ characteristic of the photoconductor so as to obtain a linear voltage corresponding to the light input. On the other hand, the setting conditions such as the diaphragm value and the sensitivity of the film used are also electrically transformed into a linear voltage so as to apply these to the arrangement, and the result of the combination of these two linear voltages are utilized to charge the memorizing capacitor. Accordingly, an accurate exposure time control can be accomplished because the operation is not influenced by the photoconductor characteristic and regulation of the light input and the set value input signal is carried out in an accurate and simple manner. Further, in the arrangement according to the present invention, the light input signal and the set value input signal are both transformed into linear voltages and these linear voltages are differentially combined and the result is indicated by an electric meter or other instrument. Therefore, the user can know the automatically controlled exposure time prior to the photographing operation. This is very advantageous in the practical operation because the set values can be reviewed and be reset in accordance with the particular photographing conditions.

With the non-equilibrium photographic measurement section, the diaphragm value, the film sensitivity value, etc., can be electrically transformed by means of independent transforming devices respectively so that the coupling between the arrangement and the camera can be advantageously simplified. In a constant-current circuit utilizing a transistor collector characteristic for the electrical transformation of diaphragm value and film sensitivity value, to the bias circuit thereof there is added a diode connection circuit of transistors of the same type, and further, the bias circuit current is stabilized with respect to the ambient temperature by means of inverse-polarity transistors. Accordingly, with a constant-current characteristic, temperature compensation and stabilization of supply voltage fluctuation compensation can be carried out so that the arrangement can be operated always in a stabilized state and proper exposure time control can be performed.

Further, while the light input signal and set value input signal are separately compensated properly in the photographic measurement section, these signals can be also compensated properly in an overall manner in the timing section. Thus, two-stage compensation can be carried out so that the arrangement can be caused to operate properly.

While the arrangement according to the present invention can be constituted by conventional circuit elements. A monolithic integrated circuit can be very advantageously utilized in constituting it to obtain good results both in its manufacturing and in its operation too.

While there has been described and illustrated a preferred embodiment of the present invention it is apparent that numerous alterations, omissions and additions may be made without departing from the spirit thereof.

What is claimed is:

1. A camera shutter timing network comprising a photosensitive device having a first electrical parameter which is a function of the light incident thereon, a memory capacitor, means for charging said memory capacitor to a voltage which is responsive to a logarithmic function of said electrical parameter, a timing capacitor, means for charging said timing capacitor at a constant rate which is a function of the voltage on said memory capacitor, and switch means responsive to the voltage on said timing capacitor for controlling said camera shutter, said memory capacitor charging means including a logarithmic compression network coupled to said photosensitive device and an adjustable gain amplifier having an input connected to the output of said compression network.

2. The network of claim 1 wherein said compression network comprises at least one diode connected in series with said photoconductor.

3. The network of claim 1 including means for producing an adjustable second electrical parameter which is related to the camera diaphragm opening value and the speed value of the camera film, said memory capacitor voltage being responsive to the difference between the logarithms of said electrical parameters.

4. The network of claim 3 including means for providing a visual indication of said parameter difference.

5. The network of claim 1 wherein said charging rate is a function of the antilog of said memory capacitor voltage.

6. The network of claim 5 including means for producing an adjustable second electrical parameter which is related to the camera diaphragm opening and the speed value of the camera film, said memory capacitor voltage being responsive to a function of the logarithms of said parameters.

7. A camera provided with an automatic exposure time control shutter system and a system measuring light through the photographic taking lens, characterized by a light measuring block comprising a photosensitive element, means including a logarithmic compression network and an amplifier for providing a first output which is logarithmic function of the light incident on said photosensitive element, a diaphragm value and film sensitivity value setting block including a variable resistor for providing a second output which is a logarithmic function of said values, a memory capacitor, means for charging said memory capacitor to a voltage which is an arithmetic function of said first and second outputs, a timing capacitor, and means including a logarithmic expansion circuit and a constant-current charging network for charging said timing capacitor at a constant rate which is an antilog function of said voltage whereby said timing capacitor is constant-current charged with a current which is proportional to the incident light amount in synchronsim with the start of the camera shutter opening and means including a switching circuit responsive to the charge on said timing capacitor for controlling said shutter whereby there is produced a delay time between the run start of the shutter opening and that of the shutter closing and control is so made that after elapse of such delay time the closing is initiated.

8. A camera according to claim 7 comprising an indicating device responsive to the charge on said memory capacitor so that the automatically set exposure time is indicated prior to shutter release action.

9. A camera shutter timing network comprising a. a photosensitive element;

b. first means including a logarithmic compression network coupled to said photosensitive element for providing a first signal responsive to a logarithmic function of the light incident on said photosensitive element;

c. second means including a variable resistor for providing a second signal which is a logarithmic function of at least one nonlight photographic parameter;

d. a memory capacitor;

e. means for charging said memory capacitor to a voltage which is an arithmetic function of said first and second signals;

f. a timing capacitor;

g. second means for charging said timing capacitor at a rate which is an antilog function of said memory capacitor voltage; and h. means responsive to the charge on said timing capacitor for controlling said camera shutter timing.

10. The network of claim 9 wherein said memory capacitor charging means charges said memory capacitor to a voltage which is a function of the arithmetic difference between said first and second signals.

11. A camera shutter timing network comprising:

a. A photosensitive element;

b. first means including a network coupled to said photosensitive element for providing a first signal responsive to a logarithmic function of the light incident on said photosensitive element;

c. second means including a variable resistor for providing a second signal which is a logarithmic function of at least one non-light photographic parameter;

d. a memory capacitor;

e. means for charging said memory capacitor to a voltage which is an arithmetic function of said first and second signals;

f. a timing capacitor;

g. second means including a logarithmic expansion circuit for charging said timing capacitor at a rate which is an antilog function of said memory capacitor voltage; and h. means responsive to the charge on said timing capacitor for controlling said camera shutter timing.

* * * * *